United States Patent [19]

Tanaka et al.

[11] Patent Number: 5,224,146
[45] Date of Patent: Jun. 29, 1993

[54] RADIO TELEPHONE SYSTEM FOR CALLING A PARTY AT PREDETERMINED INVERVALS UNTIL A RESPONSE IS RECEIVED

[75] Inventors: Masayuki Tanaka, Kokubunji; Koichi Ito, Hino, both of Japan

[73] Assignee: Kabushiki Kaisha Toshiba, Kawasaki, Japan

[21] Appl. No.: 645,411

[22] Filed: Jan. 24, 1991

[30] Foreign Application Priority Data

Jan. 26, 1990 [JP] Japan ................... 2-16422

[51] Int. Cl.⁵ ........................... H04M 11/00
[52] U.S. Cl. ........................... 379/61; 379/58
[58] Field of Search ............ 379/61, 58, 56, 63, 379/88, 67; 455/39, 54, 79

[56] References Cited

U.S. PATENT DOCUMENTS

| | | | |
|---|---|---|---|
| 4,481,382 | 11/1984 | Villa-Real | 379/61 |
| 4,706,274 | 11/1987 | Baker et al. | 379/61 |
| 4,761,806 | 8/1988 | Toki | 379/61 |
| 4,939,768 | 7/1990 | Inaba et al. | 379/58 |
| 4,959,850 | 9/1990 | Marui | 379/58 |

*Primary Examiner*—Curtis Kuntz
*Assistant Examiner*—William Cumming
*Attorney, Agent, or Firm*—Finnegan, Henderson, Farabow, Garrett & Dunner

[57] ABSTRACT

A radio telephone system which comprises a base unit connected to a wired telephone line and a radio telephone set connected to the base unit through a radio link and which has an automatic re-calling function of automatically calling a party telephone set at intervals of a predetermined time when the parts telephone set is in a speech mode. This automatic re-calling operation is carried out only in the base unit under the released condition of the radio link between the base unit and the radio telephone set, and after the base unit confirms a response from the party telephone set, the radio link is established between the radio telephone set and the base unit.

8 Claims, 5 Drawing Sheets

RADIO TELEPHONE SYSTEM FOR CALLING A PARTY AT PREDETERMINED INVERVALS UNTIL A RESPONSE IS RECEIVED

BACKGROUND OF THE INVENTION

1. Field of the Invention

The present invention relates to radio telephone systems of a multi-channel type and more particularly, to a radio telephone system which can automatically call a party telephone set at intervals of a predetermined time when the party telephone set is in its speech mode.

2. Description of the Related Art

A multi-channel type radio telephone system generally comprises a base unit connected to a wired telephone line and a radio telephone set connected to the base unit through a radio link.

With the radio telephone system having such an arrangement, when it is desired for the radio telephone set to perform communication with a party telephone set connected to an exchange which in turn leads at its another end to the other end of the wired telephone line, a caller of the radio telephone set first turns ON a hook switch provided thereon to establish the radio link between the base unit and the radio telephone set, and then enters a telephone number corresponding to the party telephone set through a dial key board provided on the radio telephone set to call the party telephone set through the base unit, the wired telephone line and the exchange. When the party telephone set answers to the call, a speech communication is established between the party telephone set and the caller radio telephone set. In this way, a speech can be realized between the radio telephone set and the party telephone set.

Meanwhile, when the party telephone set is already in its speech state and thus cannot answer to the call from the exchange, the exchange generates a busy tone (BT) and sends it to the caller radio telephone set through the wired telephone line, the base unit and the radio link. The caller or operator of the radio telephone set, when listening to the busy tone, turns OFF the hook switch to turn OFF both a transmitter of the radio telephone set and a transmitter of the base unit respectively, thus releasing the radio link established between the radio telephone set and base unit.

When the caller wants again to call the same party telephone set, the caller again turns ON the hook switch provided on the radio telephone set and then again enters the telephone number of the party telephone set through the dial keys to call the party, in the same manner as mentioned above. If the party telephone set is still in the speech mode, however, then the caller turns OFF the hook switch. After this, the same procedure must be repeated.

There has been proposed a radio telephone system of such an arrangement that the contents of the dial number entered in the previous cycle is previously stored in a control circuit of the radio telephone set or in a control circuit of the base unit so that a depression of a re-dial key provided on the radio telephone set causes sending of the same dial signal as in the previous cycle to a wired telephone line through one-touch operation. However, when the party telephone set is in the speech mode, the caller must conduct the calling operation again at the proper timing after the speech of the party telephone set is finished, requiring much labor troublesomely.

In order to avoid such troublesome operation, for example, such an arrangement is considered that, when the party telephone set does not answer to the call, the same condition as by a depression of the re-dial key of the radio telephone set is automatically established at intervals of a predetermined time to thereby automatically call the party telephone set. This arrangement is advantageous in that the troublesome calling operation at the proper timing after completion of the speech of the party telephone set can be avoided but disadvantageous in that, the radio link is established between the radio telephone set and the base unit for each calling operation, and if the call of the party telephone set fails, a waste current flows through the radio telephone set each time the call is made, which hinders the effective use of radio waves.

SUMMARY OF THE INVENTION

In view of the above respect, it is an object of the present invention to provide a radio telephone system which can perform automatic re-calling operation while preventing any waste current consumption and without hindering the effective use of radio waves.

In accordance with an aspect of the present invention, there is provided a radio telephone system which comprises a base unit connected to a wired telephone line and a radio telephone set connected to the base unit through a radio link, wherein the base unit includes means for calling a party telephone set at intervals of a predetermined time when the party is in a speech mode and means for establishing the radio link between the radio telephone set and the base unit to call the radio telephone set.

That is, in the present invention, automatic re-calling operation is carried out only by the base unit and the base unit establishes the radio link between the radio telephone set and the base unit after confirming a response form the party telephone set.

As a result, the waste current consumption of the radio telephone set and the unnecessary establishment of the radio link can be avoided.

DESCRIPTION OF THE PREFERRED EMBODIMENTS

Embodiments of the present invention will be explained by referring to the accompanying drawings.

Figure 1:
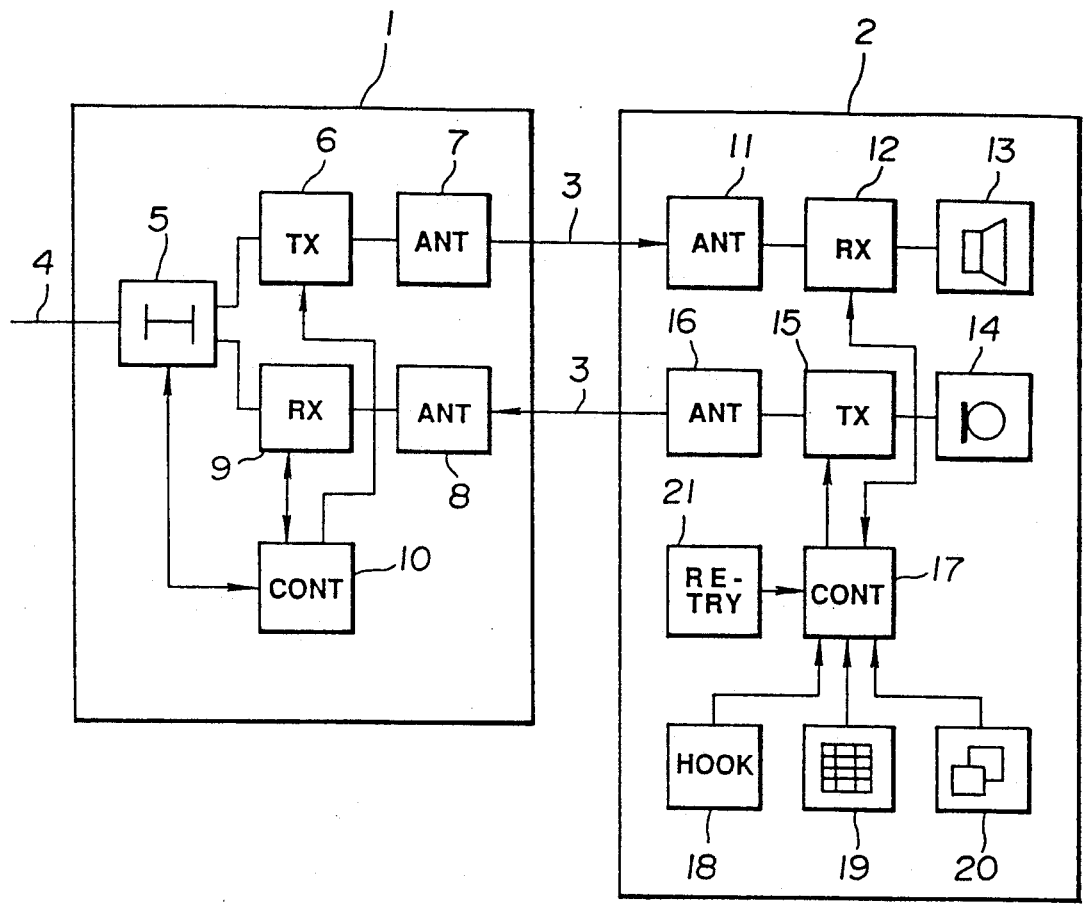
FIG. 1 shows a block diagram of a radio telephone system in accordance with an embodiment of the present invention.

Referring first to FIG. 1, there is shown a radio telephone system in accordance with an embodiment of the present invention, which comprises a base unit 1 connected to a wired line 4 and a radio telephone set 2 connected to the base unit 1 through a radio link 3. More specifically, the base unit 1 includes hybrid circuit 5, a transmitter 6, a transmitting antenna 7, a receiving antenna 8, a receiver 9 and a control circuit 10; whereas the radio telephone set 2 includes a receiving antenna 11, a receiver 12, a handset-receiver circuit 13, a handset-transmitter circuit 14, a transmitter 15, a transmitting antenna 16, a control circuit 17, a hook switch 18, a dial key board 19, a re-dial key 20 and an automatic retrying set key 21.

With such an arrangement, when it is desired for a user of the radio telephone set 2 to perform communication with the party of a desired telephone set (not shown) connected to an exchange through the wired line 4, the user of the telephone set 2 first turns ON the hook switch 18 to activate the transmitter 15 so that a control data signal issued from the control circuit 17 is transmitted from the transmitting antenna 16.

The control data signal is received at the receiving antenna 8 of the base unit 1 and then demodulated at the receiver 9. The control circuit 10 of the base unit 1, when confirming the control data signal, causes the transmitter 6 to be activated so that the control data signal from the control circuit 10 is transmitted from the transmitting antenna 7.

The radio telephone set 2, on the other hand, receives the control data signal at the receiving antenna 11 and then demodulates it at the receiver 12. The control circuit 17 of the radio telephone set 2 confirms the received control data signal, at which stage the radio link 3 is established between the base unit 1 and the radio telephone set 2.

Next, the user of the radio telephone set 2 enters the telephone number of the party telephone set through the dial key 19, this causes the control circuit 17 of the radio telephone set 2 to generate a dial data signal. The dial data signal is sent to the control circuit 10 of the base unit 1 through the transmitter 15, the transmitting antenna 16, the radio link 3, the receiving antenna 8 and the receiver 9.

The control circuit 10 of the base unit 1, when receiving the dial data signal, generates a dial signal and supplies it to the wired line 4 through the hybrid circuit 5. The exchange (not shown) connected to the wired line 4, when receiving the dial signal therethrough, calls the party telephone set allocated to the received dial signal. When the party telephone set answers to the call, the exchange establishes a speech line with the party telephone set. As a result, a voice signal entered through the handset-transmitter circuit 14 of the radio telephone set 2 is transmitted to the party telephone set through the radio link 3, the base unit 1, the wired line 4 and the exchange; while a voice signal entered through the party telephone set is transmitted to the handset-receiver circuit 13 of the radio telephone set 2 through the exchange, the wired line 4, the base unit 1 and the radio link 3. As a result, a speech communication line is established between the radio telephone set 2 and the party telephone set.

Further, the re-dial key 20 of the radio telephone set 2 is used for sending out the same dial signal as in the previous cycle to the wired line through one-touch operation. More in detail, the sending of the dial signal from the re-dial key 20 is carried out on the basis of the previously-dialed contents stored in the control circuit of the radio telephone set or in the control circuit of the base unit. Int his case, however, the calling operation must be conducted by depressing the re-dial key 20 at the proper timing after the speech of the party telephone set is completed.

The operation of the automatic re-trying set key 21 of the radio telephone set 2 forms the present invention which will be detailed below.

Figure 2:
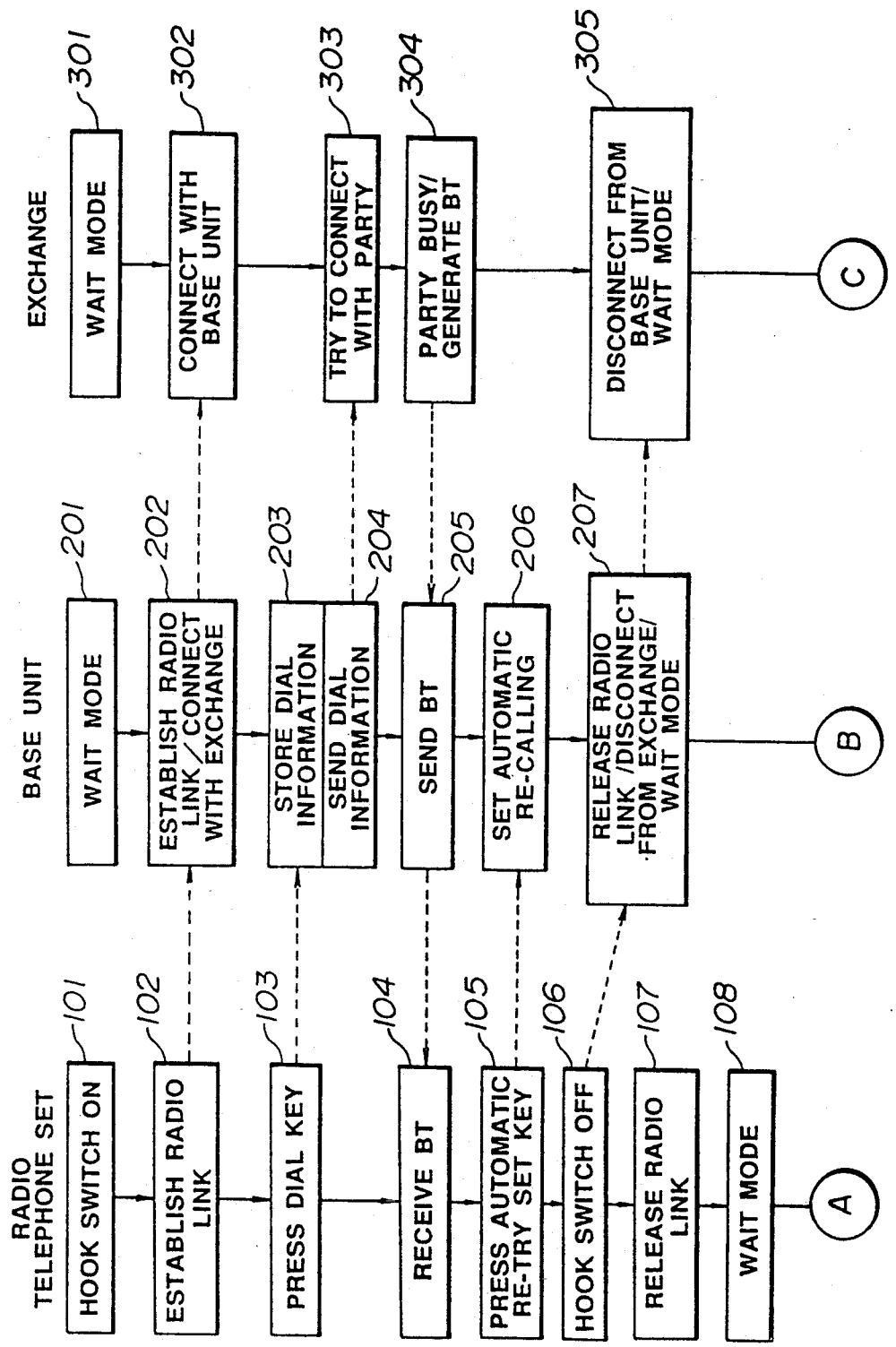
FIGS. 2 and 3 show a flowchart for explaining the operation of the embodiment of FIG. 1.
Figure 3:
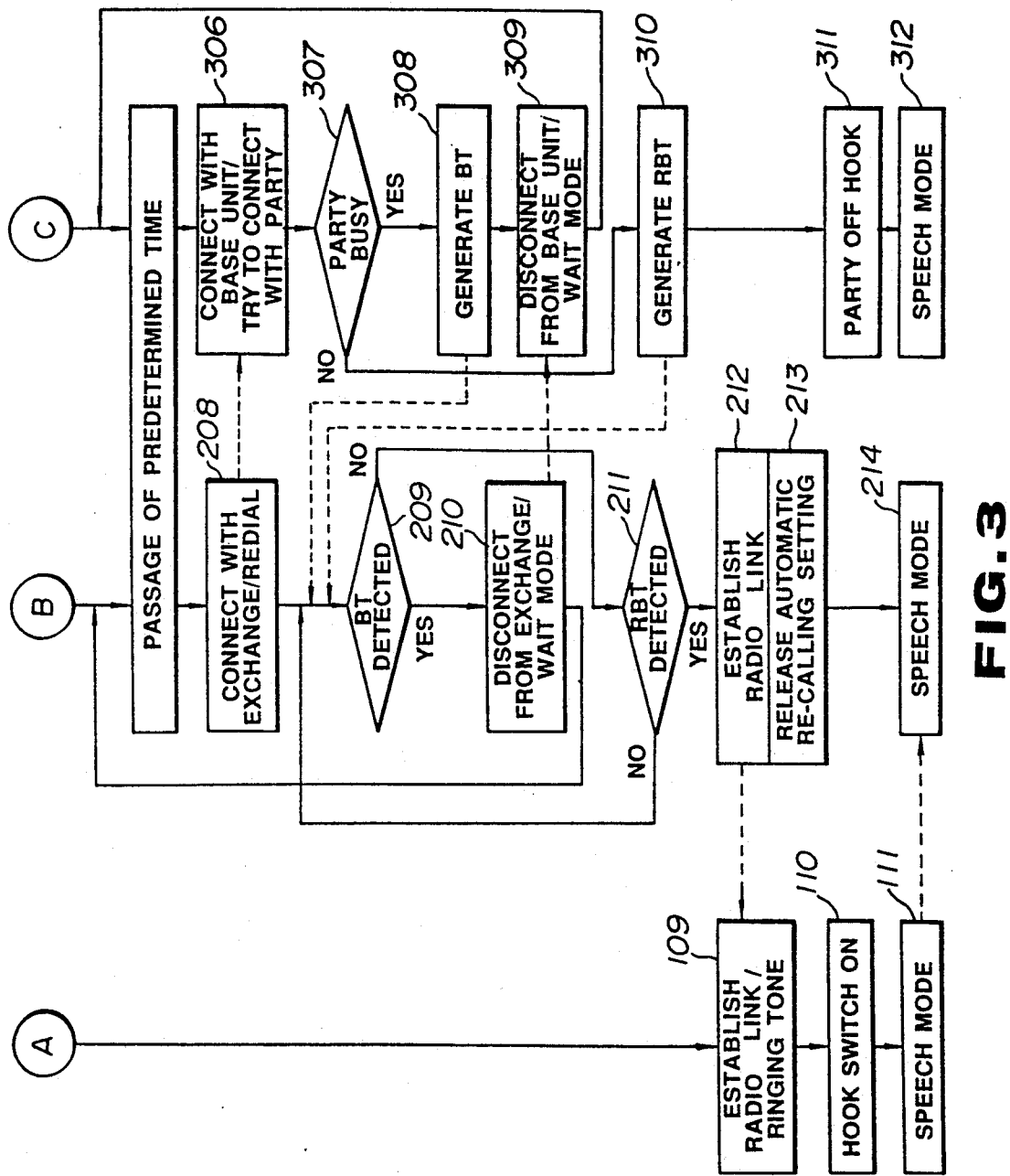

Detailed explanation will then be made as to the operation of the present embodiment in connection with a single flowchart shown in FIGS. 2 and 3 in which the same symbols encompassed by circles are connected thereat.

When the caller of the radio telephone set 2 desires to perform communication with the party of a telephone set (not shown) connected to one end of the exchange (not shown) which in turn is connected at another end to the wired line 4, the caller first turns ON the hook switch 18 of the radio telephone set 2 (step 101). This causes the transmitter 15 to be activated so that a control data signal issued from the control circuit 17 is transmitted from the transmitting antenna 16.

The control data signal is received at the receiving antenna 8 of the base unit 1 and then demodulated at the receiver 9. The control circuit 10 of the base unit 1, when confirming the control data signal, activates the transmitter 6, whereby the control data signal issued from the control circuit 10 is transmitted from the transmitting antenna 7.

On the side of the radio telephone set 2, the control data signal transmitted from the base unit is received at the receiving antenna 11 and then demodulated at the receiver 12. The control circuit 17 of the radio telephone set 2 confirms the received control data, whereby the radio link 3 is established between the base unit 1 and the radio telephone set 2 (steps 102, 201 and 202).

The caller at the side of the radio telephone set 2 next depresses the dial key 19 to enter the telephone number of the party telephone set (step 103). This causes the control circuit 17 of the radio telephone set 2 to generate a dial data signal that in turn is sent to the control circuit 10 of the base unit 1 through the transmitter 15 and transmitting antenna 16 of the radio telephone set 2, the radio link 3, and the receiving antenna 8 and receiver 9 of the base unit 1.

The control circuit 10 of the base unit 1, when receiving the dial data signal, generates a dial signal and sends it onto the wired line 4 through the hybrid circuit 5 (step 204). The exchange (not shown) connected to the other end of the wired line 4, when receiving the dial signal from the base unit 1, calls the party telephone set to which the received dial signal is allocated. When the party telephone set responds to the call, the exchange establishes a speech line with the party telephone set. As a result, a voice signal entered through the handset-transmitter circuit 14 of the radio telephone set 2 is transmitted to the party telephone set through the radio link 3, the base unit 1, the wired line 4 and the exchange; whereas, a voice signal entered from the party telephone set is transmitted to the handset-receiver circuit 13 of the radio telephone set 2 through the exchange, the wired line 4, the base unit 1 and the radio link 3. In this way, a speech communication is established between the radio telephone set 2 and the party telephone set (steps 301, 302 and 303).

In the case where the party telephone set is in its speech state and thus cannot answer to the call from the exchange, the exchange generates a busy tone (BT) (step 304) and sends the busy tone to the handset-receiver circuit 13 of the radio telephone set 2 through the wired line 4, the base unit 1 and the radio link 3 (steps 205 and 104).

At this stage, if the caller wants to use the automatic re-calling function which forms the present invention, the caller depresses the automatic re-trying set key 21 (step 105). The control circuit 17, when detecting a depression of the automatic re-trying set key 21, causes the re-calling set to be registered in the control circuit 10 of the base unit 1 through the radio link 3 (step 206). Thereafter, the caller turns OFF the hook switch 18 of the radio telephone set 2 to terminate the communication (step 106) and to release the radio link 3 (steps 107, 207 and 305), resulting in that the radio telephone set 2 is returned to a wait mode providing less consumption current (step 108). In this connection, the depression of the automatic re-trying set key 21 may be arranged to automatically terminate the communication without any need for turning OFF the hook switch.

Meanwhile, on the side of the base unit 1, the dial signal transmitted and received from the radio telephone set 2 is stored in the control circuit 10 (step 203) and when a predetermined time elapses after the termination of communication, the control circuit 10 acts to automatically send the dial signal again onto the wired telephone line 4 (step 208). When the party telephone set is still in the speech mode and thus is unable to be connected with the caller telephone set (steps 306 and 307), the exchange generates a busy tone (step 308) which is then sent therefrom to the controller 10 to be detected thereat (step 209), whereby a connection between the base unit 1 and the wired telephone line 4 is cut off and the base unit 1 and the exchange are returned to their wait state (steps 210 and 309). The setting of the automatic recall is maintained and after passage of a predetermined time, the similar re-sending operation of the dial signal is repeated, during which the radio telephone set 2 is continuously kept in the wait state. When the re-sending of the dial signal is carried out (step 208) and the interconnection of the base unit 1 with the party telephone set is made because of the end of the speech (step 307), the base unit 1 receives a ring-back tone (RBT) from the exchange (step 310). The base unit 1 detects the received ring-back tone (RBT) at the controller 10 (step 211), calls the radio telephone set 2, performs the transfer of the control data signal between the controllers 10 and 17 and establishes the radio link 3 (steps 109 and 212). More in detail, on the side of the radio telephone set 2 called by the base unit 1, caller's turning ON of the hook switch 18 (step 110) or an off-hook operation of the party telephone set (step 311) causes a speech communication to be established between the radio telephone set 2 and the party telephone set (steps 111, 214, 3211 and 312). The setting of the automatic re-call is released at the side of the base unit 1 when the base unit detects the ring-back tone (RBT) from the exchange (step 213).

A ringing tone to be generated from the radio telephone set 2 may be the same as the usual ringing tone used to inform of a reception of an incoming signal at the telephone set. In the illustrated example, however, the ringing tone informing the caller of the completion of the interconnection based on the automatic re-call can be set different from the usual ringing tone at the time of signal reception. For example, the ringing tone based on the automatic re-call that is different from the usual ringing tone in at least one of tone quality, pitch, sound volume, sounding period may be employed. If it is only required that the caller can confirm the completion of an interconnection with the party telephone set, then such visual informing means as a lamp may be used in place of the above ringing tone.

Further, although the automatic re-trying set key has been additionally provided in the foregoing embodiment, the same function of the re-trying set key may be realized by depressing a combination of a specific one of dial keys and the re-dial key.

Figure 4:
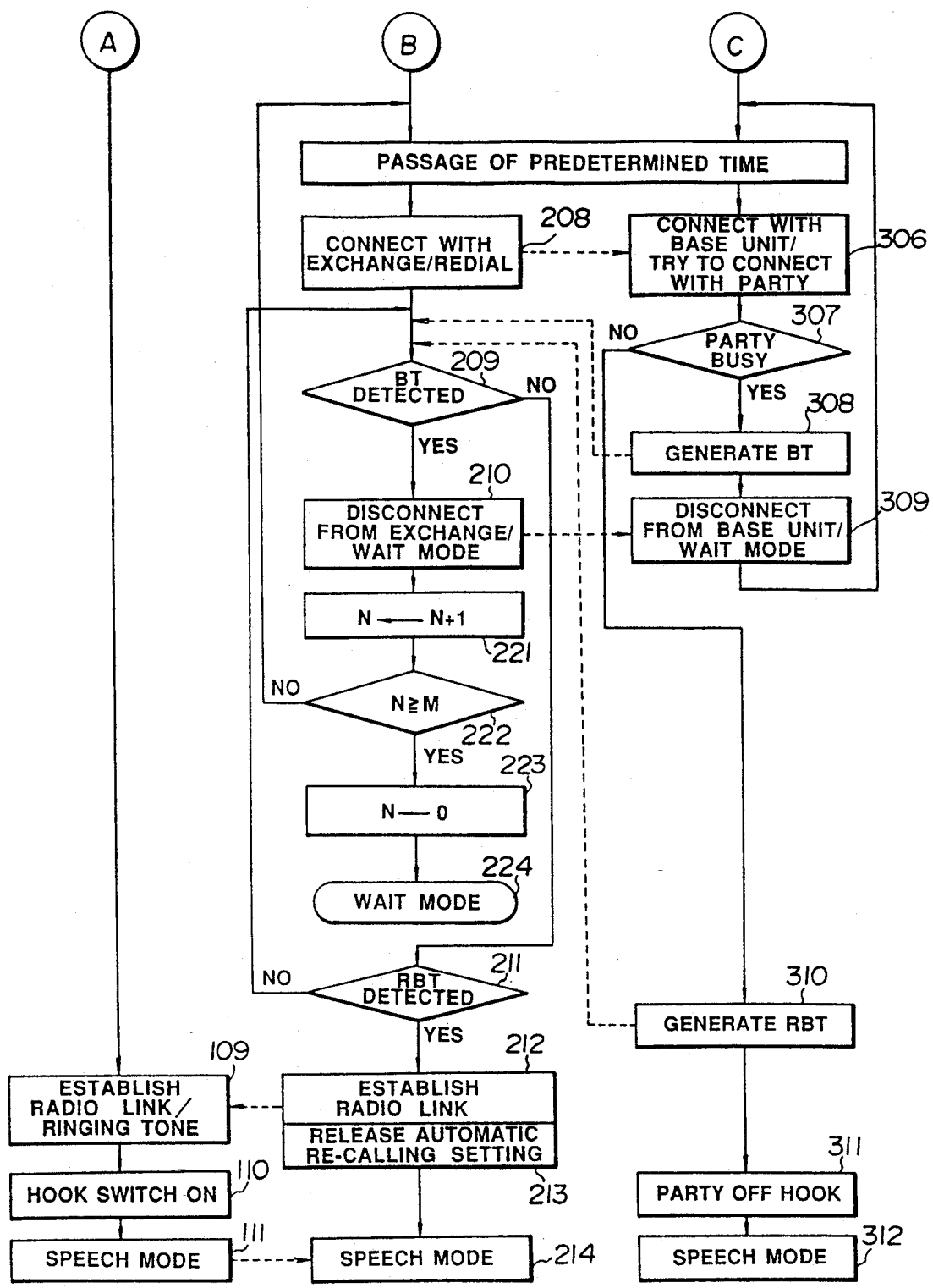
FIG. 4 is a flowchart for explaining the operation of another embodiment of the present invention.

Shown in FIG. 4 is another embodiment of the present invention which operation is basically the same as that of the flowchart of FIGS. 2 and 3, except that the number of automatic re-calling times are counted so that, when the counted value reaches a predetermined level, the embodiment is automatically put again in its wait state. FIG. 4 shows a flowchart which corresponds to the flowchart of FIG. 3 and which can be interconnected with the flowchart of FIG. 2 at the symbols encompassed by circles.

Only different steps of FIG. 4 from FIG. 3 will be mainly explained. The same steps in FIG. 4 as those in FIG. 3 are denoted by the same step numbers and explanation thereof is omitted.

In FIG. 4, when the base unit 1 is cut off from the wired telephone line 4 and returned to the wait state (steps 210, 309), a value N indicative of the number of automatic re-calling times is added by 1 and the added value is set as a new value N indicative of the number of automatic re-calling times (step 221). Then the new value N is compared with a predetermined preset value M, and when a relationship $N \geq M$ is not satisfied (step 222) or when a predetermined time elapses, the similar re-sending operation of the dial signal is repeated. During the above operation, the radio telephone set 2 is kept in the wait state.

Meanwhile, if the number of automatic re-calling times reaches the predetermined value M and thus the relationship $N \geq M$ is satisfied (step 222), then the setting of the automatic re-call is released, the value N indicative of the number of automatic re-calling times is cleared to zero (step 223), and the base unit 1 is put in the wait state (step 224). During re-sending operation of the dial signal from the base unit 1 (step 208), if the conversation of the party telephone set is already completed and thus the base unit 1 can be interconnected with the party telephone set (step 307), then the base unit receives the ring-back tone (RBT) from the exchange (step 310). When the base unit 1 detects the ring-back tone at the controller 10 (step 211), the base unit 1 calls the radio telephone set 2 and performs transfer of the control data signal between the controllers 10 and 17 to establish the radio link 3 (steps 109 and 212). When the hook switch 18 is turned ON (step 110) in the radio telephone set 2 subjected to the call from the base unit 1 or when the party telephone set is put in the off-hook state (step 311), this results int hat a speech communication is completed between the radio telephone set 2 and the party telephone set (steps 111, 214, 311 and 312). Further, the setting of the automatic re-call is released at the side of the base unit 1 when detecting the ring-back tone (RBT) from the exchange (step 213).

Figure 5:
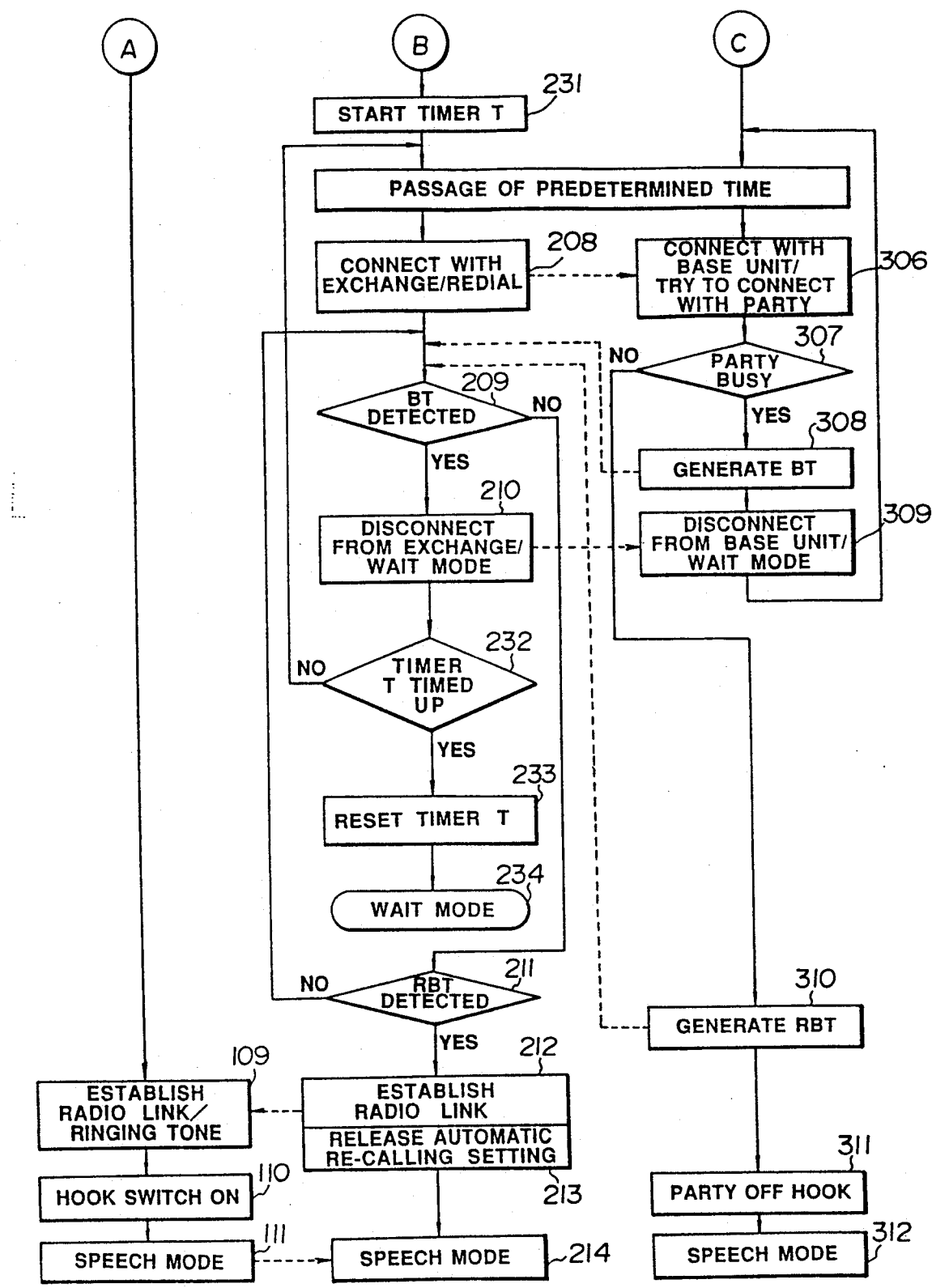
FIG. 5 is a flowchart for explaining the operation of yet another embodiment of the present invention.

FIG. 5 shows yet another embodiment of the present invention which operation is basically the same as that of the flowchart of FIGS. 2 and 3, except that, when a predetermined time elapses after start of an automatic re-call, the embodiment is automatically returned to its wait state. FIG. 5 shows a flowchart which corresponds to the flowchart of FIG. 3 and which can be interconnected with the flowchart of FIG. 2 at the symbols encompassed by circles.

In FIG. 5, first of all, a timer T is started in the base unit 1 (step 231), after which when a predetermined time elapses after start of an automatic re-call, the embodiment is automatically returned to its wait state.

FIG. 5 shows a flowchart which corresponds to the flowchart of FIG. 3 and which can be interconnected with the flowchart of FIG. 2 at the symbols encompassed by circles.

In FIG. 5, first of all, a timer T is started in the base unit 1 (step 231), after which when a predetermined time elapses, the base unit 1 automatically supplies the dial signal again onto the wired telephone line 4 (step 208). When the party telephone set is still in its speech mode and the base unit cannot be connected with the party telephone set (steps 306 and 307), the exchange generates the busy tone (step 308) that is detected at the controller 10 of the base unit 1 (step 209), which results in that the base unit 1 is cut off from the wired telephone line 4 and the base unit 1 and the exchange are both returned to their wait state (steps 210 and 309).

Then, it is checked whether the timer T started in the step 231 has expired or times up (step 232). When non-time-up is detected, the similar re-sending operation of the dial signal is repeated after passage of a predetermined time, during which the radio telephone set 2 is continuously kept in the wait state.

In the step 232, if the time-up of the timer T is detected, then the setting of the automatic re-call is released and the timer T is reset (step 233), thus putting the base unit 1 in the wait state (step 234). Other operations of the present embodiment are substantially the same as that of FIGS. 3 and 4.

What is claimed is:

1. A radio telephone system comprising:
   a base unit connected to a wired telephone line; and
   a radio telephone set connected to said base unit through a radio link,
   wherein said radio telephone set includes instruction means for instructing said base unit to set an automatic re-call through said radio link, and
   said base unit includes:
   automatic re-calling means, when said base unit receives an instruction indicative of setting of said automatic re-call from said radio telephone set, for calling a party at intervals of a predetermined time until the party responds to the call;
   counting means for counting the number of automatic re-calling times by said automatic re-calling means;
   terminating means, when a value counted by said counting means reaches a predetermined value, for terminating operation of said automatic re-calling means; and
   calling means, when the party responds to the call from said automatic re-calling means, for establishing the radio link between said radio telephone set and said base unit and for calling said radio telephone set.

2. A radio telephone system as set forth in claim 1, wherein said instruction means includes an automatic re-trying set key provided in said radio telephone set and the instruction of setting of said automatic re-call to said base unit through said radio link is carried out through a depression of said automatic re-trying set key.

3. A radio telephone system as set forth in claim 1, wherein said automatic re-calling means includes storage means for storing dial data to be automatically re-called, dial data sending means for sending the dial data stored in said storage means onto said wired telephone line at intervals of a predetermined time, busy-tone detecting means for detecting a busy tone from said wired telephone line, ring-back tone detecting means for detecting a ring-back tone from said wired telephone line, and control means for continuously keeping operation of said dial data sending means when said busy-tone detecting means detects the busy tone in response to the sending of the dial data from said dial data sending means and for terminating the operation of said dial data sending means when said terminating means operates and when said ring-back tone detecting means detects the ring-back tone in response to the sending of the dial data from said dial data sending means.

4. A radio telephone system as set forth in claim 1, wherein said calling means includes radio link establishing means for establishing a radio link between said base unit and said radio telephone set according to a response of the party and ringing-tone instructing means for instructing the base unit to generate a ringing tone through said radio link established by said radio link establishing means.

5. A radio telephone system comprising:
   a base unit connected to a wired telephone line; and
   a radio telephone set connected to said base unit through a radio link,
   wherein said radio telephone set includes instruction means for instructing said base unit to set an automatic re-call through said radio link, and
   said base unit includes:
   automatic re-calling means, when said base unit receives an instruction indicative of setting of said automatic re-call from said radio telephone set, for calling a party at intervals of a predetermined time until the party responds to the call;
   timer means for measuring an elapse time from start of the automatic re-call by said automatic re-calling means;
   terminating means, when a time measured by said timer means reaches a predetermined value, for terminating operation of said automatic re-calling means; and
   calling means, when the party telephone set responds to the call from said automatic re-calling means, for establishing the radio link between said radio telephone set and said base unit and for calling said radio telephone set.

6. A radio telephone system as set forth in claim 5, wherein said instruction means includes an automatic re-trying set key provided in said radio telephone set and the instruction of setting of said automatic re-call to said base unit through said radio link is carried out through a depression of said automatic re-trying set key.

7. A radio telephone system as set forth in claim 5, wherein said automatic re-calling means includes storage means for storing dial data to be automatically re-called, dial data sending means for sending the dial data stored in said storage means onto said wired telephone line at intervals of a predetermined time, busy-tone detecting means for detecting a busy tone from said wired telephone line, ring-back tone detecting means for detecting a ring-back tone from said wired telephone line, and control means for continuously keeping operation of said dial data sending means when said busy-tone detecting means detects the busy tone in response to the sending of the dial data from said dial data sending means and for terminating the operation of said dial data sending means when said terminating means operates and when said ring-back tone detecting means detects the ring-back tone in response to the sending of the dial data from said dial data sending means.

8. A radio telephone system as set forth in claim 5, wherein said calling means includes radio link establishing means for establishing the radio link between said base unit and said radio telephone set according to a response of the party and ringing-tone instructing means for instructing said base unit to generate a ringing tone through the radio link established by said radio link establishing means.

* * * * *